Aug. 7, 1962     G. M. RANSOM     3,048,428
HOSE NOZZLE END WITH RADIALLY EXPANSIBLE SLEEVES
Filed Jan. 29, 1960
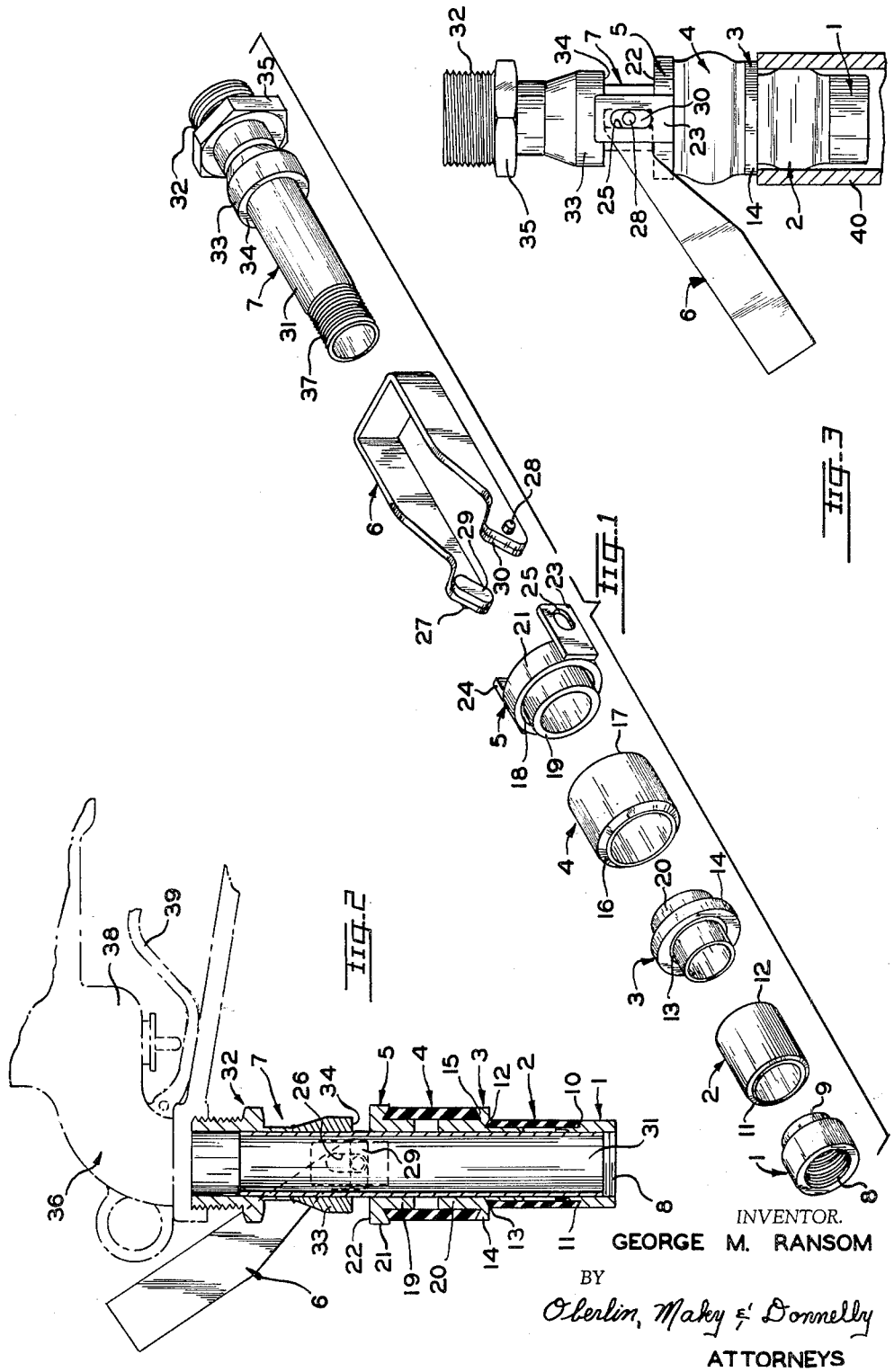
INVENTOR.
GEORGE M. RANSOM
BY
Oberlin, Maky & Donnelly
ATTORNEYS

United States Patent Office 3,048,428
Patented Aug. 7, 1962

3,048,428
HOSE NOZZLE END WITH RADIALLY
EXPANSIBLE SLEEVES
George M. Ransom, Toledo, Ohio, assignor to The Standard Oil Company, Cleveland, Ohio, a corporation of Ohio
Filed Jan. 29, 1960, Ser. No. 5,420
7 Claims. (Cl. 285—139)

This invention relates generally, as indicated, to a hose nozzle end and more particularly to a nozzle end fitting for use in filling fuel oil tanks and the like.

In gasoline service station tanks or home fuel heating system tanks, the inlet or fill pipes are of widely varying diameters. This variation may and often does exceed the limits within which a conventional hose nozzle is effective to provide a proper sealed connection with the fill pipe, and in such instances, the connection generally leaks causing obviously undesirable spillage. While this difficulty may be remedied by equiping the delivery truck with a plurality of pipe unions or couplings of varying standard sizes, such are, however, difficult to install and such installation is time consuming for the operator. Accordingly, a connection for such fill pipes, which would automatically couple the hose nozzle to such tank even when the diameters of the fill pipe vary widely, and yet maintain a perfect seal preventing such aforesaid leaks, would be highly desired.

It is therefore a primary object of my invention to provide a hose nozzle end which will accommodate a wide variety of fill pipe diameters and yet perfectly seal and hold the delivery line thereto.

It is a further principal object of my invention to provide a nozzle end construction made of a few relatively simply fabricated parts which can be conveniently interchanged.

It is yet another object of my invention to provide a fill nozzle accessory as aforesaid which can be used in close quarters effectively to seal and hold a fill line to a fill pipe.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In said annexed drawing:

FIG. 1 is an exploded perspective view of the component parts of my nozzle end;

FIG. 2 is a fragmentary vertical sectional view illustrating my nozzle end attached to a nozzle with the sealing members thereof in unexpanded position; and FIG. 3 is a fragmentary view illustrating my nozzle end inserted in a relatively small diameter fill pipe and sealed thereto.

Referring first to FIG. 1, it will be seen that my nozzle end construction consists of the following seven basic parts: end collar 1; a relatively small diameter expansion sleeve 2; a separating sleeve 3; a larger diameter expansion sleeve 4; a sliding sleeve 5; an operating handle 6; and a nozzle end member 7.

The end collar 1 is internally threaded as shown at 8 along the entire internal axial length thereof. As shown more clearly in FIG. 2, the end collar has a recessed end portion 9 which is slightly undercut with a V-shape groove as shown at 10. This undercut portion mates with a flared or beveled portion 11 on the end of the relatively small diameter expansion sleeve 2.

The opposite end of the sleeve 2 is similarly beveled as shown at 12 to mate within an annular undercut groove 13 in the separating sleeve 3. An axial enlargement or flange 14 on the sleeve 3 extending outwardly from the groove 13 includes an undercut groove 15 on the opposite side thereof of a slightly larger diameter than the groove 13. Whereas the end collar 8 was internally threaded, it will be noted that the sleeve 3 has no internal threads and is of substantially the same inside diameter. Within the groove 15, there is placed the relatively larger diameter sleve 4 having beveled end 16, the opposite end 17 of which is also beveled. This opposite end 17 of the sleeve 4 fits within an annular V-shape groove 18 in the sliding sleeve 5. The sleeve 5 has an axially extending portion 19 of the same external diameter as the axially oppositely extending portion 20 of the separating sleeve 3. It is noted that the internal diameter of the sleeves 3 and 5 are the same. In a manner corresponding to the flange 14 of the separating sieeve 3, the sleeve 5 is provided with an axially outwardly extending flange 21 presenting an upwardly facing shoulder or circular pressure area 22.

Secured to the flange 21 of the sleeve 5 at diametrically opposite positions are two upstanding ears 23 and 24, each having respectively vertically extending elongated slots 25 and 26 therein. These upstanding ears are securely fastened to the sleeve 5 as, for example, by screws or welding. Cooperating with these slots in the ears 23 and 24 is an operating lever or handle 6 of the U-shape configuration shown having oppositely extending pins 27 and 28 on each leg thereof. Secured to the inside of the legs centrally opposite the respective pins are two cams 29 and 30. Each of the cams is of the elongated shape shown having rounded end portions. The legs of the operating handle 6 are of sufficient resilience that they may be compressed together to insert the pins 27 and 28 within the slots 25 and 26 respectively.

The end member 7 includes a tubular shank 31 to which are secured enlarged threaded end portion 32 and enlargement 33 having a downwardly facing annular bearing surface 34 in the form of a sharp shoulder. The enlarged end portion 32 is provided with flat sides 35 to facilitate the attachment of the nozzle end to a nozzle as illustrated at 36 in FIG. 2. Accordingly, it will be seen that with the aid of a simple pipe wrench or the like, the nozzle end member 7 may readily be secured to such nozzle. The parts 32 and 33 may be affixed to the tubular shank 31 as by welding to provide a unitary center or core for my nozzle end construction. The end of the shank 31 is threaded as shown at 37 to mate with the threads 8 illustrated on the internal portion of the end collar 1. Thus it will be seen that the proximal end of the shank is provided with an enlargement providing a cam bearing surface, and the distal end of the shank is provided with means to hold the end of the smallest sleeve against axial movement.

The end collar 1, separating sleeve 3 and sliding sleeve 5, may preferably be made of brass or other suitable alloy and the expansion sleeves 2 and 4 may be made from rubber, neoprene or other suitable durable elastomeric material. Accordingly, it will be seen that these parts are highly corrosive and wear resistant and that my nozzle end construction will accordingly be extremely long in its useful life.

Having now described the components of my nozzle end construction, I will dwell on the manner in which they are assembled to form the complete operative nozzle structures shown in FIGS. 2 and 3. The handle 6 is squeezed such that the pins 27 and 28 may be inserted in the slots 25 and 26 in the upstanding ears of the sliding sleeve 5.

When the handle is so assembled, the natural resiliency of the legs will force the pins through such slots and in this position, the cams 29 and 30 will be spaced apart a distance at least equal to the outside diameter of the shank portion 31. When this is accomplished, the handle will be pivoted out of the way to the position shown in FIG. 2 and the sleeve 5 assembled over the threaded end 37 of the nozzle end shank 31. Following this, the large diameter expansion sleeve 4 is inserted over the shank into the groove 18. The separating sleeve 3 and the smaller diameter expansion sleeve 2 are then inserted in that order over the end of the shank 31. When the parts are thus assembled, the end collar 1 is threaded onto the threaded portion 37 of the shank 31 securely locking the parts on the member 7. When the handle is pivoted to the position shown in FIG. 2, the cams 29 and 30 will be in the horizontal position shown. For this reason, the separating sleeve 3 and sliding sleeve 5 will be in their uppermost position. The resiliency of the expansion sleeves 2 and 4 will maintain these sleeves axially separated. It is noted that the pressure axially on the sleeves may be controlled by the extent the end collar 1 is threaded on the shank 31. It is preferred that the end member 7 be firmly secured to the nozzle 36 prior to the assembly of the parts thereon, since the handle 6 in its assembled position will hinder the application of a wrench or the like to the flattened portions 35 of the enlarged threaded portion 32. The nozzle 36 is of the conventional type employing the valve 38 operated by lever 39. It can now be seen that my nozzle end construction constitutes a readily attachable and detachable accessory for such nozzle 36.

Referring to FIG. 3, it will be seen that my end construction in operation may be inserted within a relatively small diameter fill pipe 40. In this position, the top of the fill pipe may abut against the flange 14 on the separating sleeve 3. Once within the pipe, the handle 6 is pivoted to the position shown which causes the cams 29 and 30 to shift from a horizontal to a vertical position. As can readily be seen, the rounded opposite end portions of the cams will bear respectively against the shoulder 34 on the enlarged portion 33 and the opposed shoulder 22 on the top surface of the sliding sleeve 5. Thus, the sleeve 5 is forced downwardly axially to compress the large diameter expansion sleeve 4 which in turn forces the separating sleeve 3 downwardly. This in turn axially compresses the smaller diameter expansion sleeve 2 which is secured within the groove 10 on the end collar 1. Since the sleeves 2 and 4 are in compression series, both will expand outwardly when their respective retainers are moved toward the end collar. The expansion of the sleeve 2 causes a central outward bulging which firmly uniformly circumferentially grips the interior of the fill pipe 40 holding the nozzle end therein, firmly fluid sealing the end construction within the fill pipe. When this is accomplished, the operator merely actuates valve 38 through lever 39 to fill the tank with fuel without spilling any fuel in the area of the fill pipe. In the position shown in FIG. 3, the handle 6 will move the cams 29 and 30 to a slightly over-center position thus locking the sleeves in their expanded position. In this manner, the operator need not maintain a downward pressure on the handle 6 during the fill to maintain the sealed relationship of the nozzle and fill pipe. It is also noted that the handle, when in the position shown in FIG. 2, will tend to remain in such position as the result of the resiliency of the sleeves 2 and 4. It is noted that the handle can be swung or pivoted about the vertical axis of the nozzle end such that my construction may even be employed where there is a close clearance to a house or some other obstruction. Since the sleeves 2, 3, 4 and 5 are all slidable and hence rotatable about the shank portion 31, such an adjustment can readily be made to obtain a convenient operating position.

It will be understood that the number of expansion sleeves connected in compression series may be more than the two illustrated and that the size thereof may greatly be varied. With the two sleeve design embodiment illustrated, it can be seen that it is a simple task to remove the end collar 1 and replace the sleeves with larger diameter sleeves. I have found that replacement can be accomplished in a matter of minutes with conventional tools such as a pipe wrench or water pump pliers. Further, my nozzle construction may be utilized as a straight fill by either not expanding the sleeves 2 and 4 or removing the same from the shank 31 for use in filling, for example, 50 gallon barrels, unvented tanks and the like.

It will now be seen that I have provided a nozzle end construction which may readily be employed with conventional nozzles to effect a proper and firm seal for fuel fill pipes of widely varying diameters. This seal will, of course, prevent the leaks and spills which create the conditions causing damage and hazard to surrounding property.

Other modes of applying the principle of the invention may be employed, change being made as regards the details described, provided the features stated in any of the following claims or the equivalent of such be employed.

I, therefore, particularly point out and distinctly claim as my invention:

1. An end construction for fuel delivery nozzles and the like comprising a tubular shank having an external shoulder thereon adjacent the proximal end thereof, a plurality of axially compressible relatively thin wall sleeves of varying external diameters mounted on said shank, sleeve retaining means secured to said shank at the distal end thereof securing the distal end of the sleeve farthest from said shoulder to said shank, an axially sliding separating sleeve retainer mounted on said shank interconnecting said sleeves whereby said sleeves are in compression series, cam means bearing against said sholder and against one of said sleeves axially to compress said sleeves, and means to actuate said cam means compressing a U-shape handle, said cam means being secured to the legs of said handle, said sleeves being flexed outwardly away from said shank by such compression thus created to form respective peripheral bulges of different diameters about said shank.

2. An end construction as set forth in claim 1 including a sliding collar on the sleeve adjacent said shoulder, said cam means bearing against said collar and said shoulder axially to compress said sleeves, and handle retaining means on said collar, said handle and collar being swingable about the axis of said tubular shank for rotative adjustment to a convenient operating position.

3. An end construction as set forth in claim 2 wherein said handle retaining means comprises a pair of diametrically opposed upstanding ears, and elongated slots in said ears, said handle being provided with oppositely directed pins engaged within said slots.

4. An accessory for attachment to fuel delivery nozzles and the like comprising a tubular shank, means on the proximal end of said tubular shank to secure the same to such fuel delivery nozzle or the like, and end collar member on the distal end of said shank secured thereto, an expansible sleeve secured between said end collar and a separating retainer surrounding said shank and axially slidable with respect thereto, a further expansible sleeve of a slightly larger diameter secured between said separating retainer and a further slidable retainer surrounding said shank, an enlargement adjacent the proximal end of said shank spaced from said further sliding retainer and secured to said shank against axial movement, and cam means mounted on said shank between said enlargement and further sliding retainer to move said further sliding retainer with respect to said enlargement axially to compress both expansible sleeves to cause said sleeves to flex peripherally outwardly to form respective peripheral bulges of different diameters about said shank.

5. An accessory as set forth in claim 4 including upstanding ears on said further sliding retainer, said ears being slotted to retain said cam means to bear against said enlargement and said further retainer.

6. An accessory as set forth in claim 5 including handle means to operate said cam means to separate said enlargement and said further retainer, said handle means being swingable about the axis of said tubular member for rotative adjustment to a convenient operating position.

7. An accessory as set forth in claim 6 wherein said cam means comprises elongated members affixed to the inside of said handle means.

References Cited in the file of this patent

UNITED STATES PATENTS

| | | |
|---|---|---|
| 402,600 | Kemp | May 7, 1889 |
| 775,124 | Christman | Nov. 15, 1904 |
| 2,321,515 | Rice | June 8, 1943 |
| 2,593,454 | Hyser | Apr. 22, 1952 |
| 2,646,293 | Gray | July 21, 1953 |
| 2,784,627 | Mueller | Mar. 12, 1957 |
| 2,872,963 | Boyer | Feb. 10, 1959 |

FOREIGN PATENTS

| | | |
|---|---|---|
| 289,933 | Switzerland | July 16, 1953 |

UNITED STATES PATENT OFFICE

CERTIFICATE OF CORRECTION

Patent No. 3,048,428                    August 7, 1962

George M. Ransom

It is hereby certified that error appears in the above numbered patent requiring correction and that the said Letters Patent should read as corrected below.

Column 2, line 13, for "sleve" read -- sleeve --; column 4, line 36, for "sholder" read -- shoulder --; line 38, for "compressing" read -- comprising --.

Signed and sealed this 4th day of December 1962.

(SEAL)
Attest:

ERNEST W. SWIDER
Attesting Officer

DAVID L. LADD
Commissioner of Patents